United States Patent
Wendelberger

(10) Patent No.: US 10,410,221 B2
(45) Date of Patent: Sep. 10, 2019

(54) SYSTEM AND METHOD FOR DETERMINING A GROUPING OF SEGMENTS WITHIN A MARKET

(75) Inventor: James G. Wendelberger, Los Alamos, NM (US)

(73) Assignee: Urban Science Applications, Inc., Detroit, MI (US)

( * ) Notice: Subject to any disclaimer, the term of this patent is extended or adjusted under 35 U.S.C. 154(b) by 3009 days.

(21) Appl. No.: 12/027,582

(22) Filed: Feb. 7, 2008

(65) Prior Publication Data
US 2009/0204655 A1    Aug. 13, 2009

(51) Int. Cl.
*G06Q 30/02*    (2012.01)

(52) U.S. Cl.
CPC ......... *G06Q 30/02* (2013.01); *G06Q 30/0204* (2013.01)

(58) Field of Classification Search
None
See application file for complete search history.

(56) References Cited

U.S. PATENT DOCUMENTS

| | | | |
|---|---|---|---|
| 4,937,763 A | 6/1990 | Mott | |
| 7,672,865 B2* | 3/2010 | Kumar et al. | 705/7.33 |
| 2002/0161668 A1* | 10/2002 | Lutz et al. | 705/26 |
| 2003/0014227 A1* | 1/2003 | Gunyaso et al. | 703/2 |
| 2005/0071146 A1* | 3/2005 | Kind | 703/22 |
| 2007/0100550 A1* | 5/2007 | Hawkinson | 701/220 |
| 2007/0133878 A1* | 6/2007 | Porikli et al. | 382/190 |
| 2008/0033787 A1* | 2/2008 | Keil et al. | 705/10 |
| 2008/0222561 A1* | 9/2008 | Helfman et al. | 715/810 |
| 2008/0249820 A1* | 10/2008 | Pathria et al. | 705/7 |

OTHER PUBLICATIONS

Sewall, Murphy A. Market Segmentation Based on Consumer Ratings of Proposed Product Designs. Journal of Marketing Reserach vol. XV, Nov. 1978, 557-64. (Year: 1978).*

Wayne Desarbo, Rajdeep Grewal, and Crystal Scott. A Clusterwise Bilinear Multidimensional Scaling Methodology for Simultaneous Segmentation and Positioning Analyses. Journal of Marketing Research vol. XLV, Jun. 2008, p. 280-292. (Year: 2008).*

Tonks, David Graham. Validity and the Design of Market Segments. Journal of Marketing Management, University of Lancaster, UK, vol. 25, No. 3-4, pp. 341-356, 2009 (Year: 2009).*

* cited by examiner

*Primary Examiner* — Stephanie Z Delich
(74) *Attorney, Agent, or Firm* — Pepper Hamilton LLP

(57) ABSTRACT

A method for determining a grouping of segments within a market. The method includes forming a bias mitigated square matrix from a square matrix populated with second choice data, and forming a compressed matrix from the bias mitigated square matrix. Each different segment is initially associated with a row of the square matrix and a column of the square matrix. The method also includes determining a matrix consistency score for the compressed matrix, forming at least one additional compressed matrix from the bias mitigated square matrix, and determining matrix consistency scores for each additional compressed matrix. The method further includes determining which matrix consistency score is best.

20 Claims, 5 Drawing Sheets

|  | 1st | 2nd | 3rd | 4th | 5th | 6th | 7th | 8th | 9th | 10th |
|---|---|---|---|---|---|---|---|---|---|---|
| 1st | 0 | 0 | 0 | 0 | 0 | 333 | 0 | 667 | 0 | 0 |
| 2nd | 0 | 0 | 0 | 250 | 0 | 0 | 250 | 0 | 500 | 0 |
| 3rd | 0 | 0 | 0 | 0 | 333 | 0 | 0 | 0 | 0 | 667 |
| 4th | 0 | 200 | 0 | 0 | 0 | 0 | 100 | 0 | 200 | 0 |
| 5th | 0 | 0 | 250 | 0 | 0 | 0 | 0 | 0 | 0 | 250 |
| 6th | 250 | 0 | 0 | 0 | 0 | 0 | 0 | 250 | 0 | 0 |
| 7th | 0 | 200 | 0 | 100 | 0 | 0 | 0 | 0 | 200 | 0 |
| 8th | 667 | 0 | 0 | 0 | 0 | 333 | 0 | 0 | 0 | 0 |
| 9th | 0 | 500 | 0 | 250 | 0 | 0 | 250 | 0 | 0 | 0 |
| 10th | 0 | 0 | 667 | 0 | 333 | 0 | 0 | 0 | 0 | 0 |

FIG. 3

|  | 1st | 2nd | 3rd | 4th | 5th | 6th | 7th | 8th | 9th | 10th |
|---|---|---|---|---|---|---|---|---|---|---|
| 1st | 0 | 0 | 0 | 0 | 0 | 333 | 0 | 667 | 0 | 0 |
| 2nd | 0 | 0 | 0 | 250 | 0 | 0 | 250 | 0 | 500 | 0 |
| 3rd | 0 | 0 | 0 | 0 | 333 | 0 | 0 | 0 | 0 | 667 |
| 4th+7th | 0 | 400 | 0 | 100 | 0 | 0 | 100 | 0 | 400 | 0 |
| 5th | 0 | 0 | 250 | 0 | 0 | 0 | 0 | 0 | 0 | 250 |
| 6th | 250 | 0 | 0 | 0 | 0 | 0 | 0 | 250 | 0 | 0 |
| 8th | 667 | 0 | 0 | 0 | 0 | 333 | 0 | 0 | 0 | 0 |
| 9th | 0 | 500 | 0 | 250 | 0 | 0 | 250 | 0 | 0 | 0 |
| 10th | 0 | 0 | 667 | 0 | 333 | 0 | 0 | 0 | 0 | 0 |

FIG. 4

|  | 1st | 2nd | 3rd | 4th+7th | 5th | 6th | 8th | 9th | 10th |
|---|---|---|---|---|---|---|---|---|---|
| 1st | 0 | 0 | 0 | 0 | 0 | 333 | 667 | 0 | 0 |
| 2nd | 0 | 0 | 0 | 500 | 0 | 0 | 0 | 500 | 0 |
| 3rd | 0 | 0 | 0 | 0 | 333 | 0 | 0 | 0 | 667 |
| 4th+7th | 0 | 400 | 0 | 200 | 0 | 0 | 0 | 400 | 0 |
| 5th | 0 | 0 | 250 | 0 | 0 | 0 | 0 | 0 | 250 |
| 6th | 250 | 0 | 0 | 0 | 0 | 0 | 250 | 0 | 0 |
| 8th | 667 | 0 | 0 | 0 | 0 | 333 | 0 | 0 | 0 |
| 9th | 0 | 500 | 0 | 500 | 0 | 0 | 0 | 0 | 0 |
| 10th | 0 | 0 | 667 | 0 | 333 | 0 | 0 | 0 | 0 |

FIG. 5

SYSTEM AND METHOD FOR DETERMINING A GROUPING OF SEGMENTS WITHIN A MARKET

BACKGROUND

This application discloses an invention that is related, generally and in various embodiments, to a system and method for determining a grouping of segments within a market.

In many organizations, strategic decisions are made based on the information available at that time. Although the amount of available information can be relatively large, in many instances, such information is not organized in a manner that allows decision makers to recognize how some portions of the information are related to other portions of the information. Thus, for applications where an understanding of such relationships forms the basis for a well-informed decision, the availability of a large amount of information does not necessarily result in a well-informed decision.

SUMMARY

In one general respect, this application discloses a system for determining a grouping of segments within a market. According to various embodiments, the system includes a computing device. The system also includes at least one of the following: a bias mitigation module, a matrix compression module, and a matrix consistency score module. The bias mitigation module is for reducing bias from second choice data of a square matrix. The matrix compression module is for compressing the square matrix. The matrix consistency score module is for determining a matrix consistency score for the compressed matrix.

In another general respect, this application discloses a method for determining a grouping of segments within a market. According to various embodiments, the method includes forming a bias mitigated square matrix from a square matrix populated with second choice data, and forming a compressed matrix from the bias mitigated square matrix. Each different segment is initially associated with a row of the square matrix and a column of the square matrix. The method also includes determining a matrix consistency score for the compressed matrix, forming at least one additional compressed matrix from the bias mitigated square matrix, and determining matrix consistency scores for each additional compressed matrix. The method further includes determining which matrix consistency score is best.

According to other embodiments, the method includes forming a bias mitigated square matrix from a square matrix populated with second choice data, and forming an expanded matrix from the bias mitigated square matrix. The method also includes determining a matrix consistency score for the expanded matrix, forming at least one additional expanded matrix from the bias mitigated square matrix, and determining matrix consistency scores for each additional expanded matrix. The method further includes determining which matrix consistency score is best.

Aspects of the disclosed invention may be implemented by a computer system and/or by a computer program stored on a computer-readable medium. The computer-readable medium may comprise a disk, a device, and/or a propagated signal.

BRIEF DESCRIPTION OF THE DRAWINGS

Various embodiments of the invention are described herein by way of example in conjunction with the following figures.

FIG. 3 illustrates an example of a matrix populated with second choice data;

FIG. 4 illustrates an example of a reduced matrix populated with second choice data; and FIG. 5 illustrates an example of a compressed matrix populated with second choice data.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 1:
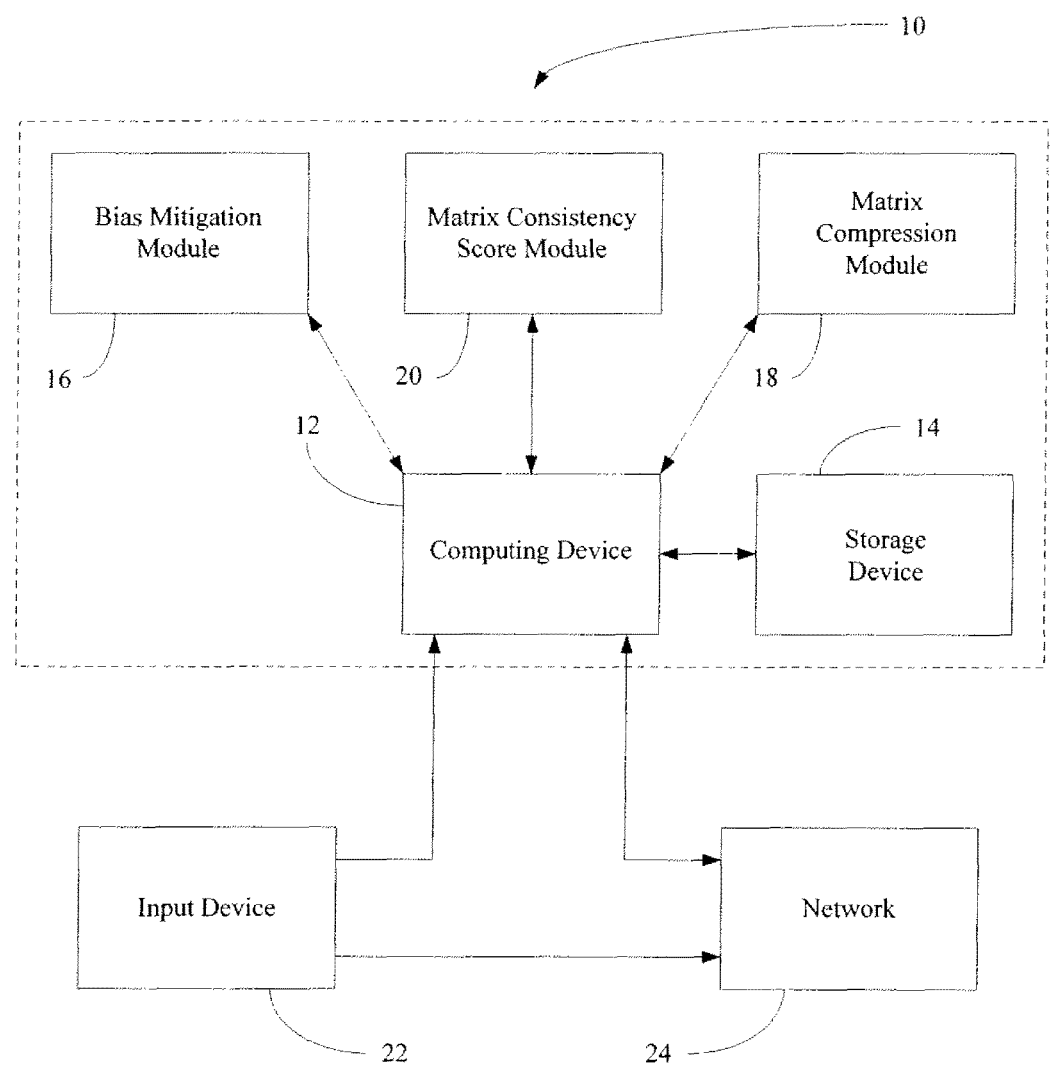
FIG. 1 illustrates various embodiments of a system for determining a grouping of segments within a market.

FIG. 1 illustrates various embodiments of a system 10 for determining a grouping of segments within a market. In general, the segments may be segments from any type of market. For example, according to various embodiments, a particular segment may represent a particular automobile vehicle make/model, a group of automobile vehicle make/models, etc.

The system 10 includes a computing device 12, and a storage device 14 in communication with the computing device 12. The computing device 12 may be any suitable type of computing device capable of responding to and executing instructions. For example, the computing device 12 may be implemented as a server, a personal computer, a workstation, a laptop computer, etc. Although only one computing device 12 is shown in FIG. 1, it will be appreciated that according to various embodiments, the system 10 includes more than one computing device.

The storage device 14 may be any suitable type of storage device (e.g., a magnetic storage device, an optical storage device, etc.). Although only one storage device 14 is shown in FIG. 1, it will be appreciated that according to various embodiments, the system 10 includes more than one storage device.

The system 10 also includes one or more modules in communication with the computing device 12. Such modules include, for example, a bias mitigation module 16, a matrix compression module 18, and a matrix consistency score module 20. The bias mitigation module 16 is configured for mitigating bias associated with a matrix populated with second choice data. The matrix compression module 18 is configured for compressing a square matrix. The matrix with a compressed module 18 is configured for determining a matrix consistency score associated with a compressed matrix. According to various embodiments, one or more of the modules 16, 18, 20 may comprise a portion of the computing device 12.

The modules 16, 18, 20 may be implemented in hardware, firmware, software or any combination thereof. According to various embodiments, the modules 16, 18, 20 may be implemented as a software application, a computer program, etc. utilizing any suitable computer language (e.g.) Fortran, C, C++, Delphi, Java, JavaScript, Perl, Visual Basic, VBScript, etc.) and may be embodied permanently or temporarily in any type of machine, component, physical or virtual equipment, storage medium, or propagated signal capable of delivering instructions to a device. The software code may be stored as a series of instructions or commands on a computer-readable medium such that when a processor reads the medium, the functions described herein are performed. As used herein, the term "computer-readable medium" may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more propagated signals, and such propagated signals may or may not be transmitted on one or more carrier waves.

Although the modules 16, 18, 20 are shown as three separate modules in FIG. 1, one skilled in the art will appreciate that the functionality of the modules 16, 18, 20 may be distributed across any number of modules. According to various embodiments, one or more of the modules 16, 18, 20 may be installed on separate, distinct systems. Also, different functional aspects of the modules 16, 18, 20 may be installed on separate, distinct devices.

The computing device 12 may be in communication with an input device 22 and/or a network 24. The input device 22 may be any suitable type of input device, and may be in direct communication with the computing device 12 or in communication with the computing device 12 via the network 24. The network 24 may have wired and/or wireless data pathways, and may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 24 may include elements, such as, for example, intermediate nodes, proxy servers, routers, switches, and adapters configured to direct and/or deliver data.

Figure 2:
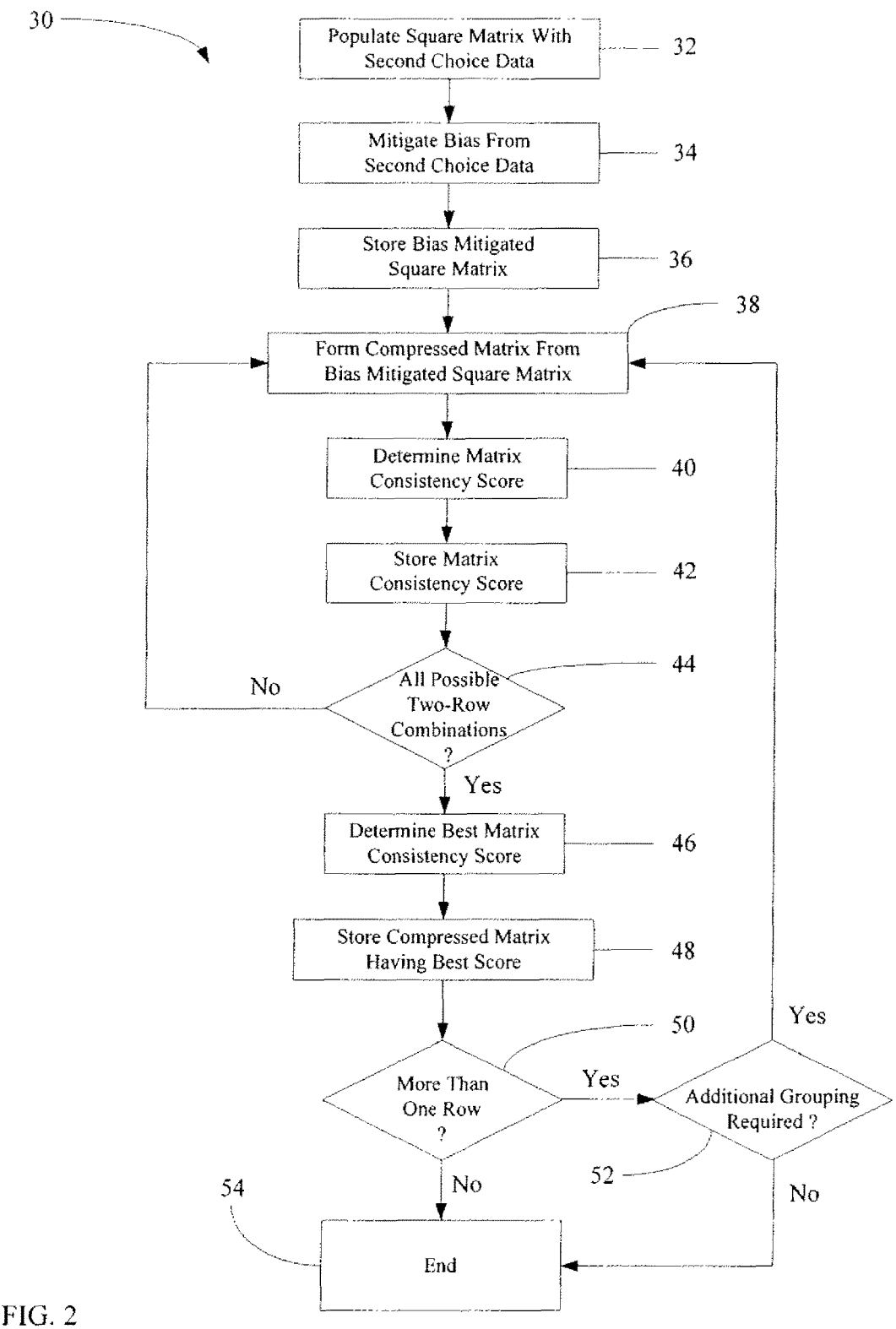
FIG. 2 illustrates various embodiments of a method for determining a grouping of segments within a market.

FIG. 2 illustrates various embodiments of a method 30 for determining a grouping of segments within a market. The method 30 may be performed by the system 10 of FIG. 1. Prior to the start of the process, a number of market segments are identified. Any number of market segments greater than two may be identified, by any entity, in any suitable manner. In general, the market segments may be segments from any type of market. For example, according to various embodiments, a particular identified market segment may represent a particular automobile vehicle make/model, a group of automobile vehicle make/models, etc.

For ease of explanation purposes only, the method 30 will be described for applications where ten different markets segments are initially identified. However, those skilled in the art will appreciate that the method 30 is suitable for applications where the number of different market segments initially identified are less than ten (e.g., three), equal to ten, or more than ten (e.g., 400). Second choice data associated with the different market segments is also secured prior to the start of the process. According to various embodiments, the second choice data may be provided by a third-party. The initial format of the secured/provided second choice data may be any suitable format. For implementations where the initial format of the second choice data is not a square matrix format, the second choice data is coerced into a square matrix format prior to the start of the process.

According to various embodiments, the process starts at block 32, where a square matrix is populated with the second choice data. For each different market segment initially identified, the respective market segment is initially associated with a row of the matrix and with a column of the matrix. Therefore, the size of the square matrix is dependent upon the number of different market segments initially identified. For example, if ten different market segments are initially identified, the matrix will be a 10×10 matrix. The second choice data is represented by the elements of the populated matrix. According to various embodiments, the computing device 12 of the system 10 of FIG. 1 may be utilized to populate the square matrix with the second choice data at block 32.

Although the process is described as starting at block 32, those skilled in the art will appreciate that according to other embodiments, the populated square matrix may be provided by a third-party. Thus, for such embodiments, the process starts at block 34.

An example of a 10×10 matrix populated with second choice data is illustrated in FIG. 3. In this example, a first market segment is initially associated with row 1 and with column 1, a second market segment is initially associated with row 2 and with column 2, a third market segment is initially associated with row 3 and column 3, etc. The element in the matrix cell defined by row 6 and column 1 (i.e., 250) represents how many purchasers of the product associated with the first market segment indicated that the product associated with the sixth market segment was their second choice. In other words, had they not purchased the product associated with the first market segment, they would have purchased the product associated with the sixth market segment. Similarly, the element in the matrix cell defined by row 8 and column 1 (i.e., 667) represents how many purchasers of the product associated with the first market segment indicated that the product associated with eighth market segment was their second choice. In other words, had they not purchased the product associated with first market segment, they would have purchased the product associated with eighth market segment. In this example, the diagonal elements of the original second choice matrix are equal to zero. It is understood that for other examples, at least one of the diagonal elements of the original second choice matrix may have a value other than zero.

The above example arbitrarily designates the columns as the "primary" identifiers of the market segments and the rows as the "secondary" identifiers of the market segments. The "primary" identifiers correspond to the purchased product associated with the segment, and the "secondary" identifiers correspond to the second choice or hypothetical replacement product which would have been purchased had the purchased product not been available. One skilled in the art will appreciate that, in other examples, the rows may be designated as the "primary" identifiers of the market segments and the columns as the "secondary" identifiers of the market segments. For purposes of clarity, the remainder of the process will be described for examples where the columns are the "primary" identifiers of the market segments and the rows are the "secondary" identifiers of the market segments. However, one skilled in the art will appreciate that the invention described herein may also be realized utilizing an analogous process where the rows are the "primary" identifiers of the market segments and the columns are the "secondary" identifiers of the market segments.

From block 32, the process advances to block 34, where bias is mitigated from the second choice data of the square matrix. According to various embodiments, the bias mitigation module 16 of the system 10 of FIG. 1 may be utilized to mitigate the bias at block 34. The bias mitigated at block 34 may include any number of different types of bias which are present due to any number of circumstances. For example, when a person purchases a vehicle from a dealer who only sells a particular brand of vehicle, "showroom bias" may influence the second choice indicated by the purchaser. In such circumstances, instead of indicating a "true" second choice, the purchaser may be biased toward indicating a second choice that is another model of the same brand sold by the dealer. This scenario results in the dealer being a first-choice entity and a second choice entity.

Another circumstance in which bias occurs is when a person purchases a vehicle from a dealer but the person actually aspired to buy a different and more expensive vehicle. Such "aspiration bias" may influence the second choice indicated by the purchaser. In such circumstances, instead of indicating a "true" second choice that would correspond to a replacement vehicle for the first choice, the purchaser may be biased towards indicating a second choice that corresponds to a vehicle which is substantially different than the first choice. This scenario results in the second choice being substantially different than the first choice. The substantial difference may be in the form of the second choice being twice as expensive as the first choice, in the form of the second choice being a large vehicle with nine seats and the first choice being a small vehicle with only two seats, etc.

According to various embodiments, showroom bias is mitigated by reducing a value of a matrix element when the matrix element is associated with a first-choice entity. The amount of the reduction may vary by application, and may be in any amount, any percentage, etc. For example, according to some embodiments, for matrix elements associated with a first-choice entity, the reduction may only reduce the value of the element by 25% whereas in other embodiments, the reduction may reduce the value of the element to zero. According to other embodiments, aspiration bias is mitigated in an analogous manner when the matrix element is associated with a substantially different product.

From block 34, the process advances to block 36, where the bias-mitigated square matrix is stored. According to various embodiments, the bias-mitigated square matrix is stored in the storage device 14 of the system 10 of FIG. 1. From block 36, the process advances to block 38, where a compressed matrix is formed from the bias mitigated square matrix. According to various embodiments, the computing device 12 of the system 10 of FIG. 1 may be utilized to form the compressed matrix. According to other embodiments, the matrix compression module 18 of the system 10 of FIG. 1 may be utilized to form the compressed matrix.

According to various embodiments, the compressed matrix is formed in the following manner at block 38. First, two rows of the bias mitigated square matrix (e.g., a 10×10 matrix) are aggregated to form a reduced matrix (e.g., a 9×10 matrix). The two rows may be any two rows of the bias mitigated square matrix. The respective elements of the two rows of the bias mitigated square matrix are aggregated on a column-by-column basis, and the aggregation of the two rows results in the elimination of one row. An example of a 9×10 reduced matrix is shown in FIG. 4, where, for purposes of simplicity, two rows of the square matrix of FIG. 3 (rows 4 and 7) are shown aggregated on a column-by-column basis. In this example, the aggregated rows are designated as row 4+7, and the aggregation results in the elimination of row 7. One skilled in the art will appreciate that in many implementations, at least one of the elements of the bias mitigated square matrix will differ from a corresponding element of the square matrix of block 32. Thus, for such implementations, at least one the elements of the reduced matrix formed from the bias mitigated square matrix will differ from the elements shown in FIG. 4.

After the reduced matrix is formed, the two columns of the reduced matrix which correspond to the two aggregated rows are aggregated to form the compressed matrix (e.g., a 9×9 matrix). The respective elements of the two columns of the reduced matrix are aggregated on a row-by-row basis, and the aggregation of the two columns results in the elimination of one column. An example of a 9×9 compressed matrix is shown in FIG. 5, where two columns of the reduced matrix of FIG. 4 (columns 4 and 7) are shown aggregated on a row-by-row basis. In this example, the aggregated columns are designated as column 4+7, and the aggregation results in the elimination of column 7.

From block 38, the process advances to block 40, where a matrix consistency score is determined for the compressed matrix formed at block 38. According to various embodiments, the matrix consistency score is determined by determining an internal consistency score, determining a cross-segment inconsistency score, and determining a difference between the internal consistency score and the cross-segment inconsistency score. The internal consistency score is determined by aggregating the diagonal matrix elements of the compressed matrix. The cross-segment inconsistency score is determined by aggregating the matrix elements which are not on the diagonal of the compressed matrix. According to various embodiments, the matrix consistency score module 20 of the system 10 of FIG. 1 may be utilized to determine the matrix consistency score at block 40.

In the compressed matrix shown in FIG. 5, the internal consistency score is determined by aggregating the diagonal elements of the compressed matrix. The cross-segment inconsistency score is determined by aggregating the non-diagonal elements of the compressed matrix. For the compressed matrix of FIG. 5, the internal consistency score is 200, the cross-segment inconsistency score is 7800, and the difference between the internal consistency score and the cross-segment inconsistency score is −7600.

According to various embodiments, the internal consistency score and the cross-segment consistency score are designated as positive scores. For such embodiments, the matrix consistency score is determined by comparing the two scores. For example, a comparison may include the difference between the two scores. Thus, the matrix consistency score may be designated as the internal consistency score minus the cross-segment inconsistency score.

From block 40, the process advances to block 42, where the matrix consistency score is stored. According to various embodiments, matrix consistency score is stored in a manner which relates it to the compressed matrix. For example, the stored matrix consistency score may be related to the compressed matrix via the particular two-row combination which was utilized to form the compressed matrix. According to various embodiments, the matrix consistency score is stored in the storage device 14 of the system 10 of FIG. 1.

From block 42, the process advances to block 44, where it is determined whether a compressed matrix has been formed for each possible two-row combination of the bias mitigated square matrix. For a given 10×10 matrix, there are forty-five different possible two-row combinations. Thus, forming a compressed matrix for each possible two-row combination of a 10×10 matrix involves forming, in different ways, forty-five compressed matrices. For a given 3×3 matrix, there are only three different possible two-row combinations. Thus, forming a compressed matrix for each possible two-row combination of a 3×3 matrix involves forming, in different ways, three compressed matrices. According to various embodiments, the computing device 12 of the system 10 of FIG. 1 may be utilized to make the determination at block 44.

If it is determined at block 44 that the actions have not been carried out for each possible two-row combination of the bias mitigated square matrix, the process returns to block 38 where the process described at blocks 38-42 is carried out for a different two-row combination. The process described at blocks 38-44 may be repeated until the actions have been carried out for each possible two-row combination.

However, if it is determined at block 44 that the actions have been carried out for each possible two-row combination of the bias mitigated square matrix, the process advances from block 44 to block 46, where it is determined which of the compressed matrices formed at block 38 has the best matrix consistency score. According to various embodiments, the computing device 12 of the system 10 of FIG. 1 may be utilized to make the determination at block 46. According to other embodiments, the matrix consistency score module 18 of the system 10 of FIG. 1 may be utilized to make the determination at block 46.

According to various embodiments, the best matrix consistency score is the one with the largest difference between the internal consistency score and the cross-segment inconsistency score. For instances where the largest difference between the internal consistency score and the cross-segment inconsistency score is shared by two or more of the compressed matrices (e.g., 9×9 matrices) formed at block 38, one of the compressed matrices may be designated as having the best matrix consistency score. According to various embodiments, if two or more compressed matrices share the largest matrix consistency score, the designation of one as the best may be done randomly. According to other embodiments, the designation may be done deterministically. For example, the designation may be done deterministically based on the internal consistency scores of the respective compressed matrices, based on the cross-segment inconsistency scores of the respective compressed matrices, based on the relative sizes of the market segments represented by the combined rows, based on when the best score was firstly (or lastly) encountered, etc.

According to other embodiments of the method 30, the actions described at block 46 may be carried out after block 40 and before block 42. For such embodiments, only the current best matrix consistency score and the way to reform or recompute the matrix or matrices associated with the current best matrix consistency score would need to be stored at block 42. Also, for such embodiments, the process would advance from block 44 to block 48.

Returning to FIG. 2, from block 46, the process advances to block 48, where the compressed matrix having the best consistency score is stored. According to various embodiments, the compressed matrix having the best consistency score is stored in the storage device 14 of the system 10 of FIG. 1.

From block 48, the process advances to block 50, where it is determined whether the compressed matrix has more than one row. According to various embodiments, the computing device 12 of the system 10 of FIG. 1 may be utilized to make the determination at block 50.

From block 50, the process advances to either block 52 or to block 54. If the compressed matrix has more than one row remaining, the process advances from block 50 to block 52.

However, if the compressed matrix only has one row remaining, the process advances from block 50 to block 54, where the process ends.

At block 52, it is determined whether any additional grouping of the market segments is required. As the number of rows remaining in the compressed matrix corresponds to the number of segments within a given market, the determination made at block 52 may be based, for example, on the number of rows remaining in the compressed matrix. According to various embodiments, the computing device 12 of the system 10 of FIG. 1 may be utilized to make the determination at block 52.

From block 52, the process either advances to block 54 or returns to block 38. If it is determined at block 52 that no additional grouping of the market segments is required, the process advances from block 52 to block 54, where the process ends. For example, if a particular application requires that ten segments of a given market be grouped into five segments, the determination made at block 52 will be to advance to block 54 to end the process if the number of rows remaining in the matrix is equal to five.

However, if it is determined at block 52 that additional grouping of the market segments is required, the process returns from block 52 to block 38. For example, if a particular application requires that ten segments of a given market be grouped into five segments, the determination made at block 52 will be to return to block 38 if the number of rows remaining in the compressed matrix is greater than five. When the process returns to block 38, the process advances in a manner similar to that described hereinabove, the difference being that the 9×9 compressed matrix which had the best matrix consistency score is utilized in lieu of the bias mitigated square matrix at block 38 to form further compressed matrices (e.g., 8×8 matrices). From the foregoing, one skilled in the art will appreciate that the process described at blocks 38-52 may be repeated one or more times for a given application, with each repetition providing a "best" compressed matrix which identifies different groupings of market segments. Thus, one skilled in the art will also appreciate that the method 30, as well as the system 10 of FIG. 1, may also be utilized to determine a hierarchy of segments within a given market. The "final" segmentation may be derived from the various matrices stored at block 48, and may comprise a record of the sequence in which the respective rows were aggregated.

As used herein, each of the terms "row" and "column" are meant to have their customary and ordinary meaning. However, as each market segment is initially associated with both a row and a column, one skilled in the art will appreciate that the same results realized by the method 30 can be achieved by "flipping" or transposing the initial matrix such that the rows become the columns and the columns become the rows, populating the matrix accordingly, and performing the row operations. By flipping or transposing the matrix, operations performed on the rows as described hereinabove are carried out on the columns, and the operations performed on the columns as described hereinabove are carried out on the rows.

Also, although the method 30 was described in the context of starting with a particular number of segments and determining a hierarchy based on combining segments, one skilled in the art will appreciate that the system 10 may also be utilized to implement a method which starts with one segment (or a relatively small number of segments) and determines a hierarchy based on expanding the segment into additional segments. For example, starting with only three segments, a 3×3 square matrix would be populated with second choice data. Bias would then be mitigated from the square matrix to form a bias mitigated square matrix. Expanded matrices (e.g., 4×4 matrices) would then be generated by expanding one of the rows of the 3×3 square matrix into two rows to form a 4×3 matrix, then expanding the column of the 4×3 matrix associated with the row into two columns to form the expanded 4×4 matrix. Such a process could be repeated any number of times until a particular the number of segments are identified.

Therefore, while several embodiments of the invention have been described herein by way of example, those skilled in the art will appreciate that various modifications, alterations, and adaptations to the described embodiments may be realized without departing from the spirit and scope of the invention defined by the appended claims.

What is claimed is:

1. A system for determining a grouping of segments within a market, the system comprising:
   a computing device; and
   a computer-readable storage medium in communication with the computing device, wherein the computer-readable storage medium comprises one or more programming instructions for performing the following:
   identifying a plurality of market segments,
   securing second choice data comprising an indication of how many purchasers of a product in a first one of the market segments indicated that a product in a second one of the market segments was the purchaser's second choice, wherein the product in the second one of the market segments was not purchased by the corresponding purchaser,
   forming a bias mitigated square matrix from a square matrix, wherein the square matrix is populated with the second choice data, wherein the square matrix comprises rows and columns associated with the plurality of market segments,
   forming a first compressed matrix from the bias mitigated square matrix,
   determining a matrix consistency score for the first compressed matrix,
   forming at least one additional compressed matrix from the bias mitigated square matrix,
   determining a matrix consistency score for each additional compressed matrix,
   determining which of the determined matrix consistency scores is best; and
   providing a grouping of market segments, the grouping corresponding to the compressed matrix having the best matrix consistency score.

2. The system of claim 1, wherein the one or more programming instructions for forming the bias mitigated square matrix comprise one or more programming instructions for reducing a value of a matrix element of the square matrix when the matrix element is associated with a first choice.

3. The system of claim 1, wherein the one or more programming instructions for forming the bias mitigated square matrix comprise one or more programming instructions for reducing a value of a matrix element of the square matrix when the matrix element is associated with a second choice which is substantially different from a first choice.

4. The system of claim 1, wherein the one or more programming instructions for forming the compressed matrix comprise one or more programming instructions for:
   forming a reduced matrix from the bias mitigated square matrix; and
   forming the compressed matrix from the reduced matrix.

5. The system of claim 4, wherein the one or more programming instructions for forming the reduced matrix comprise one or more programming instructions for aggregating matrix elements of a two-row combination of the bias mitigated square matrix on a column-by-column basis.

6. The system of claim 5, wherein the one or more programming instructions for forming the compressed matrix comprise one or more programming instructions for aggregating two columns corresponding to the two rows on a row-by-row basis.

7. The system of claim 1, wherein the one or more programming instructions for determining the matrix consistency score of the compressed matrix comprise one or more programming instructions for:
   determining an internal consistency score;
   determining a cross-segment inconsistency score; and
   determining a difference between the cross-segment inconsistency score and the internal consistency score.

8. The system of claim 7, wherein the one or more programming instructions for determining the internal consistency score comprise one or more programming instructions for aggregating diagonal matrix elements of the compressed matrix.

9. The system of claim 7, wherein the one or more programming instructions for determining the cross-segment inconsistency score comprise one or more programming instructions for aggregating non-diagonal matrix elements of the compressed matrix.

10. The system of claim 1, wherein the one or more programming instructions for determining which matrix consistency score is best comprise one or more programming instructions for:
    determining a difference between an internal consistency score and an cross-segment inconsistency score for each compressed matrix; and
    determining which difference is largest.

11. The system of claim 10, further comprising one or more programming instructions for designating one matrix consistency score best when the largest difference is associated with two or more matrix consistency scores.

12. The system of claim 11, wherein designating comprises arbitrarily designating one matrix consistency score best when the largest difference is associated with two or more matrix consistency scores.

13. The system of claim 11, wherein the one or more programming instructions for designating comprise one or more programming instructions for deterministically designating one matrix consistency score best when the largest difference is associated with two or more matrix consistency scores.

14. The system of claim 1, further comprising one or more programming instructions for determining a hierarchy of segments within the market.

15. The system of claim 1, further comprising one or more programming instructions for populating the square matrix with the second choice data.

16. The system of claim 1, further comprising one or more programming instructions for storing at least one of the following:
    the bias mitigated square matrix;
    the matrix consistency scores; and
    the compressed matrix having the best consistency score.

17. The system of claim 1 further comprising:
    a bias mitigation module in communication with the computing device, wherein the bias mitigation module is configured to mitigate a bias associated with the square matrix;

a matrix compression module in communication with the computing device configured to compress the square matrix; and a matrix consistency score module in communication with the computing device configured to determine the matrix consistency score associated with the compressed matrix.

18. A system for determining a grouping of segments within a market, the system comprising:

a computing device; and a computer-readable storage medium in communication with the computing device, wherein the computer-readable storage medium comprises one or more processing instructions for performing the following:

identifying a plurality of market segments, securing second choice data comprising an indication of how many purchasers of a product in a first one of the market segments indicated that a product in a second one of the market segments was the purchaser's second choice, wherein the product in the second one of the market segments was not purchased by the corresponding purchaser, forming a bias mitigated square matrix from a square matrix populated with second choice data, forming an expanded matrix from the bias mitigated square matrix, determining a matrix consistency score for the expanded matrix, forming at least one additional expanded matrix from the bias mitigated square matrix, determining a matrix consistency score for each additional expanded matrix, determining which of the determined matrix consistency scores is best, and providing a grouping of market segments, the grouping corresponding to the expanded matrix having the best matrix consistency score.

19. The system of claim 18 further comprising:

a bias mitigation module in communication with the computing device, wherein the bias mitigation module is configured to mitigate a bias associated with the square matrix;

a matrix compression module in communication with the computing device configured to compress the square matrix; and a matrix consistency score module in communication with the computing device configured to determine the matrix consistency score associated with the expanded matrix.

20. A system for determining a grouping of automobiles within a market, the system comprising:

a computing device; and a computer-readable storage medium in communication with the computing device, wherein the computer-readable storage medium comprises one or more processing instructions for performing the following:

identifying a plurality of market segments, securing second choice data comprising an indication of how many purchasers of a first automobile in a first one of the market segments indicated that a second automobile in a second one of the market segments was the purchaser's second choice, wherein the second automobile in the second one of the market segments was not purchased by the corresponding purchaser, forming a bias mitigated square matrix from a square matrix by mitigating automobile-related biases associated with the second choice data, forming a first compressed matrix from the bias mitigated square matrix, determining a matrix consistency score for the first compressed matrix, forming at least one additional compressed matrix from the bias mitigated square matrix, determining a matrix consistency score for each additional compressed matrix, determining which of the determined matrix consistency scores is best, and providing a grouping of market segments, the grouping corresponding to the compressed matrix having the best matrix consistency score.

* * * * *